United States Patent
Kim et al.

[11] Patent Number: 5,838,375
[45] Date of Patent: Nov. 17, 1998

[54] METHOD AND APPARATUS FOR CODING AN IMAGE AND REDUCING BIT GENERATION BY HVS (HUMAN VISUAL SENSITIVITY)

[75] Inventors: Seong-jin Kim; Sung-gul Ryoo, both of Suwon; Seung-kwon Paek, Seoul, all of Rep. of Korea

[73] Assignee: Samsung Electronics Co., Ltd., Kyungki-do, Rep. of Korea

[21] Appl. No.: 741,790

[22] Filed: Nov. 1, 1996

[30] Foreign Application Priority Data

Nov. 1, 1995 [KR] Rep. of Korea .................. 1995-39223

[51] Int. Cl.$^6$ ....................................... H04N 7/32
[52] U.S. Cl. ........................ 348/394; 348/416; 348/699
[58] Field of Search ............................ 348/384, 390–394, 348/396, 400–402, 405, 407, 409–413, 415, 416, 420, 699; 382/232, 236, 238, 251; H04N 7/130, 7/137

[56] References Cited

U.S. PATENT DOCUMENTS

| | | | |
|---|---|---|---|
| 4,764,805 | 8/1988 | Rabbani et al. | 348/396 |
| 5,079,621 | 1/1992 | Daly et al. | 348/396 |
| 5,157,488 | 10/1992 | Pennebaker | 348/405 |
| 5,212,549 | 5/1993 | Ng et al. | 348/409 |
| 5,293,228 | 3/1994 | Marti | 348/391 |
| 5,412,430 | 5/1995 | Nagata . | |
| 5,475,433 | 12/1995 | Jeong | 348/405 |
| 5,623,310 | 4/1997 | Kim | 348/396 |

FOREIGN PATENT DOCUMENTS

| | | |
|---|---|---|
| 0490539 | 6/1992 | European Pat. Off. . |
| 0534350 | 3/1993 | European Pat. Off. . |

OTHER PUBLICATIONS

"Test Model 3, Draft Revision 1", Section 5 through 6.5.6 (pp. 27–34), Nov. 25, 1992.

Lukas et al., *DPCM Quantization of Color Television Signals*, IEEE Transactions on Communications, vol. com–31, No. 7, Jul. 1983, pp. 927–932.

Dyck et al., *Subband/VQ Coding in Perceptually Uniform Color Spaces*, IEEE Multidimensional Signal Processing, vol. 3, Mar. 23, 1992, pp. 237–240.

*Primary Examiner*—Richard Lee
*Attorney, Agent, or Firm*—Rothwell, Figg, Ernst & Kurz

[57] ABSTRACT

A method and apparatus for coding an image for reducing the amount of bit generation. Those are realized by eliminating a perceptual error from a predict error, which is generated in performing a differential pulse coded modulation (DPCM) procedure with respect to a movement between moving pictures, by using a look up table (LUT) defined for human perceptual color tolerance in the YUV chromatic domain.

10 Claims, 4 Drawing Sheets

FORWARD FRAME     CURRENT FRAME     BACKWARD FRAME

METHOD AND APPARATUS FOR CODING AN IMAGE AND REDUCING BIT GENERATION BY HVS (HUMAN VISUAL SENSITIVITY)

BACKGROUND OF THE INVENTION

The present invention relates to method and apparatus for coding an image, and more particularly, to method and apparatus for coding an image for reducing the amount of bit generation, by eliminating a perceptual error from a predict error, which is generated in performing a differential pulse coded modulation (DPCM) procedure with respect to a movement between moving pictures, by using a look up table (LUT) defined for human perceptual color tolerance in the YUV chromatic domain.

As various video information services make advances in video media technology, it is inevitable that these video information services will increase the amount of video information generated. However, in the conventional analog video transmission technique, there is a problem in that huge amounts of video information can not be processed during a real time scale in accordance with various requests by users. Therefore, a digital video signal compression-coding technique (it is called shortly a coding technique) has been proposed to reduce only the amount of video information while keeping the picture quality, by converting analog video signals into digital video signals and then compressing them by using their redundancies.

An MPEG2 coding technique (for a moving picture, not a still picture), for coding I, P, B pictures composed of a YUV chromatic coordinate system, is comprised of four steps, including: a DPCM procedure for defining a predict error in a macroblock unit; a discrete cosine transform (DCT) procedure for defining the magnitude of a predict error in a block unit for each frequency component; a rate control procedure for deciding a quantization step-size by using a cumulative buffer amount specifying the difference between a real and a target amount of bit generation; and, a quantization procedure for carrying out a quantization of a discrete cosine transformed predict error by using a quantization matrix and the quantization step-size defined in the rate control procedure.

In this kind of MPEG2 coding system, the correlation between a forward and a current original frame is defined by a motion vector to reduce the redundancies of video signals. Hence, when a real current original frame is coded, only a predict error between a real original frame to be coded and a predict frame (defined in a DPCM procedure for estimating and compensating a motion vector) is coded and then transmitted to a decoder through a limited transmission line to be restored to an original frame.

Here, a DPCM procedure to reduce the redundancies of video signals is as follows. In a DPCM procedure, as shown in FIG. 3, when macroblock C of a current original frame is coded, a macroblock having the smallest error within a search window is defined for a macroblock f or b located at the same position (x,y) of a forward or backward original frame, respectively, in other words, a macroblock having the most similar video signal characteristics to macroblock C, is defined by deciding a motion vector (fMVx, fMVy) or (bMVx, bMVy) having the minimum absolute error sum, dmc, by using the full or the half pel search methods adopting the absolute error sum, dmc, defined in FIG. 4. Then, using an estimated motion vector, a predict frame is defined, as shown in FIG. 4, by comparing square error, var1, and square error sum, vmc, of a forward reference frame, and average variance, var0, of a current original frame, to each other. The difference between a predict frame, defined in this method, and a current original frame, is called a predict error. However, there are problems in this method as follows:

First, if a predict error (defined as "e" in macroblocks m1 and m2 (as shown in FIG. 3)) by a DPCM procedure is so small that the chromatic difference cannot be noticeable by a human sense, it can be negligible. However, in a MPEG2 coding technique, there is a problem of generating needless (redundant) bits because a predict error is processed by considering only the difference mathematically defined without considering the perceptual difference between a predict frame and an original frame.

Second, a problem occurs in case of inequalities, 0<D<CT, 0<CT<2QM, and D>QM/2, when a predict error D, with negligible perceptual difference within a perceptual color tolerance (CT), is quantized with a quantization step-size QM in a quantization procedure for compressing video signals. It is described in detail by using the following equation (1), that is, an MPEG2 quantization relationship:

$$D'=\text{Round}(D/QM+0.499999) \quad QE=D-D'*QM \tag{1}$$

In the case of carrying out a quantization procedure for a predict error D satisfying inequalities, 0<D<CT, 0<CT<2QM, and D<QM/2, by using equation (1), the deterioration of picture quality for a reference frame by a quantization error does not occur because a quantization error satisfies the relationship, (QE=D)<CT. However, in case of carrying out a quantization procedure for a predict error D satisfying inequalities, 0<D<CT, 0<CT<2QM, and D>QM/2, the deterioration of picture quality for a reference frame by a quantization error does occur because of the relationship of a quantization error, QE=D−QM. Therefore, there is a problem of deteriorating the picture quality of a reference frame for a predict error even without having a real perceptual chromatic difference.

SUMMARY OF THE INVENTION

An object of the present invention is to provide a method and apparatus for coding an image for reducing the amount of predict error generated in a DPCM procedure by using a perceptual color tolerance, to solve the problem described above.

To obtain the object described above, there is provided an image coding method according to the present invention, comprising of the steps:

(a) generating a predict frame from current original and forward reference frames by a differential pulse coded modulation (DPCM);

(b) deciding a perceptual color tolerance of a chromatic component for each pixel of the current t0 original frame;

(c) generating a predict error between the predict frame and the current original frame;

(d) comparing the predict error output from the step (c) and the perceptual color tolerance output from the step (b);

(e) generating a perceptual predict error recomposed by the predict error having a perceptual chromatic difference according to a result compared in step (d); and, (f) coding the current original frame by using the predict frame and the perceptual predict error output from step (e) and then composing a restored frame.

Further, to obtain the object described above, there is provided an image coding apparatus according to the present invention, comprising:

an image input portion having a current original, a forward original, and a forward reference frame, as inputs, and for generating a predict frame from the current original and forward reference frames by a differential pulse coded modulation (DPCM);

a perceptual color tolerance decision portion for deciding a perceptual color tolerance of a chromatic component for each pixel of the current original frame input from the image input portion;

a predict error generator for generating a predict error between the predict frame input from the image input portion and the current original frame;

a perceptual predict error comparator for comparing the predict error output from the predict error generator and the perceptual color tolerance output from the perceptual color tolerance decision portion;

a perceptual predict error generator for generating a perceptual predict error recomposed by the predict error having a perceptual chromatic difference according to a result compared in the perceptual predict error comparator; and, a decoder for coding the current original frame by using the predict frame and the perceptual predict error output from the perceptual predict error generator and then composing a restored frame.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

Figure 1:
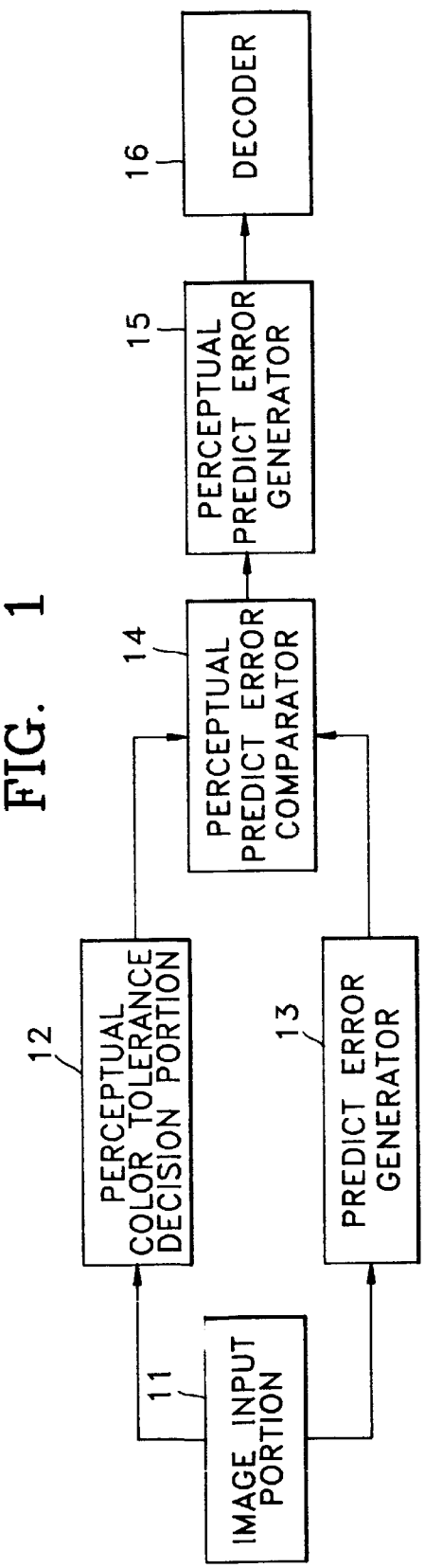
FIG. 1 is a block diagram of an image coding apparatus according to the present invention.

A block diagram of an image coding apparatus according to the present invention is illustrated in FIG. 1 which comprises an image input portion 11 having a current original, forward original, and forward reference frame as inputs, and for generating a predict frame from the current and forward reference frames by differential pulse coded modulation (DPCM). The image coding apparatus also includes a perceptual color tolerance decision portion 12 for deciding a perceptual color tolerance of each pixel of the current original frame input from image input portion 11. A predict error generator 13 also is disclosed for generating a predict error between the current original frame and the predict frame input from image input portion 11. Perceptual predict error comparator 14 compares the predict error output from predict error generator 13 with the perceptual color tolerance output of each pixel output from perceptual color tolerance decision portion 12. Perceptual predict error generator 15 generates a perceptual predict error which is recomposed by the predict error having a perceptual chromatic difference according to the result compared in perceptual predict error comparator 14. A decoder 16 is also disclosed for coding the current original frame by using the predict frame and the perceptual color tolerance output from perceptual predict error generator 15 and then composing a restored frame.

The present invention relates to an MPEG coding system for improving the picture quality of a restored frame, as well as for reducing the compressed bit generation amount, based on the fact that if a predict error, generated in the procedure of DPCM, is negligible to human sensory perception, it does not affect the picture quality of a restored frame.

Figure 2:
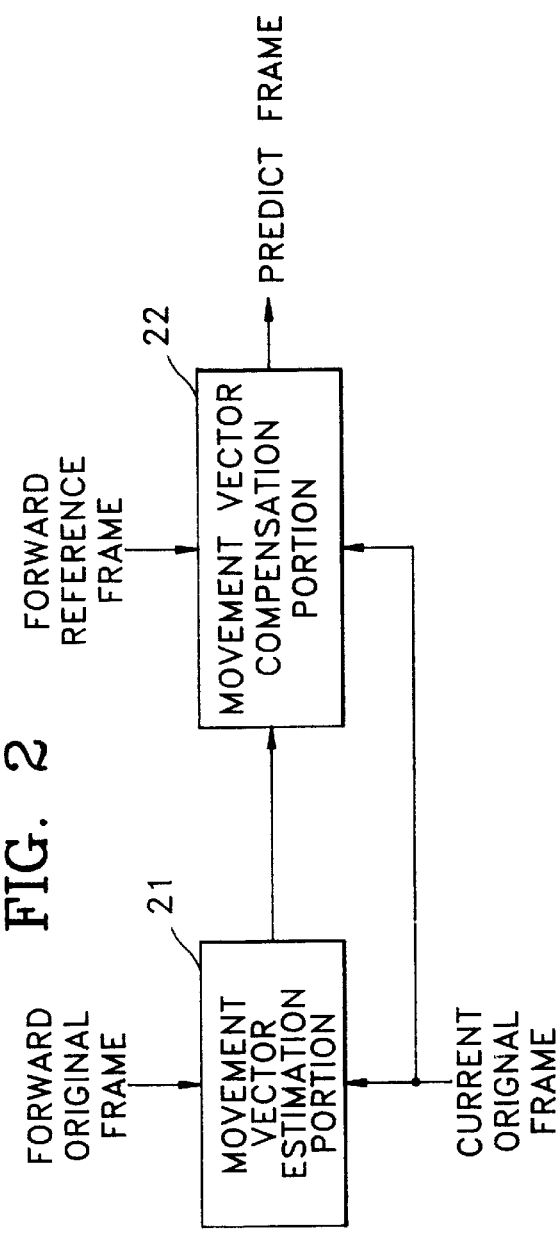
FIG. 2 is a detailed block diagram of the image input portion shown in FIG. 1.
Figure 3:
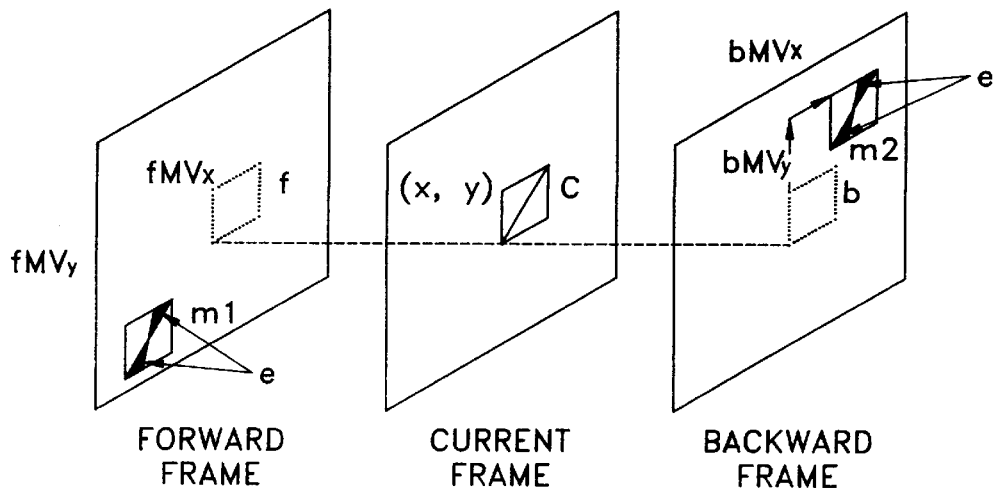
FIG. 3 is a drawing for describing a method for constituting a motion vector and a predict error between frames.
Figure 4:
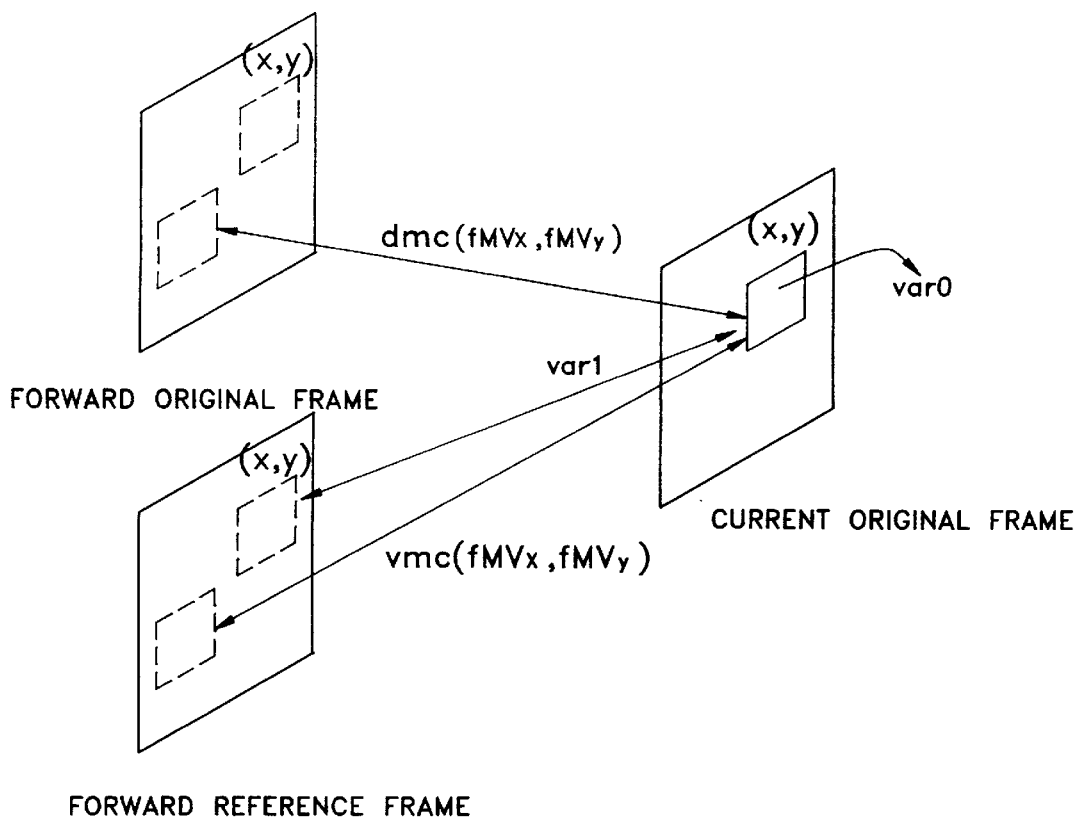
FIG. 4 is a drawing for describing a motion estimation and compensation in FIG. 1.

Image input portion 11, as shown in FIG. 2, is composed of motion vector estimation portion 21 and motion vector compensation portion 22. Image input portion 11 estimates, as shown in FIGS. 3 and 4, a motion vector to be used for extracting the correlation between frames, composed on a YUV chromatic coordinate system in a time frequency region, by using the forward and current original frame. The image input portion 11 also defines, as shown in FIG. 4, a predict frame by applying an estimated motion vector to the current original and forward reference frame by DPCM. Therefore, image input portion 11 outputs the current original frame, the forward original frame and predict frame with respect to the current original frame and the forward original frame, as shown in FIG. 2.

Figure 6:
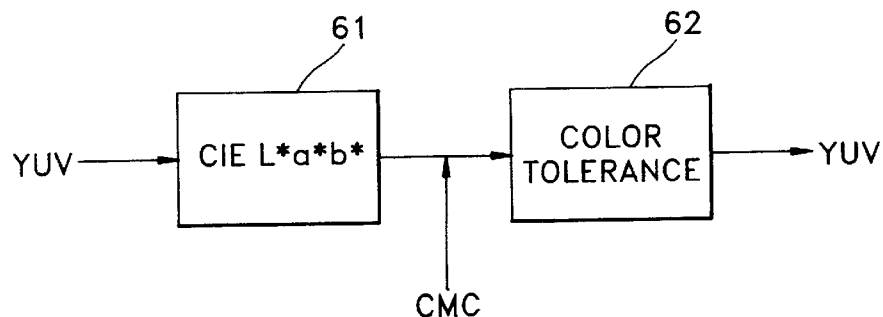
FIG. 6 is a detailed block diagram of the perceptual color tolerance decision portion shown in FIG. 1.

Perceptual color tolerance decision portion 12 is used in the image coding apparatus of the present invention for deciding a perceptual color tolerance for an arbitrary pixel of the current original frame input from image input portion 11 with respect to Y, U, V color components, respectively. As illustrated in FIG. 6; since it is possible to keep a more precise linearity by defining a perceptual color tolerance in a chromatic coordinate system in which human perceptual chromatic differences are uniformly distributed, the YUV nonuniform chromatic space for defining chromatic information of a color video is transformed into the CIE L*a*b* uniform chromatic space in first transformer 61. In second transformer 62, a perceptual color tolerance is decided for L, a, b, chromatic components by using a perceptual chromatic difference equation, recommended by the Color Measurement Committee (CMC). In this transformed CIE L*a*b* chromatic coordinate system, the decided CIE L*a*b*perceptual color tolerance is transformed into a perceptual color tolerance for Y, U, and V chromatic components, and then the YUV perceptual color tolerance for a pixel is decided. A perceptual color tolerance decided by this kind of method for the YUV chromatic coordinate system is processed in a real time scale by using the perceptual chromatic difference look-up table (LUT) shown in FIG. 7.

Figure 7:
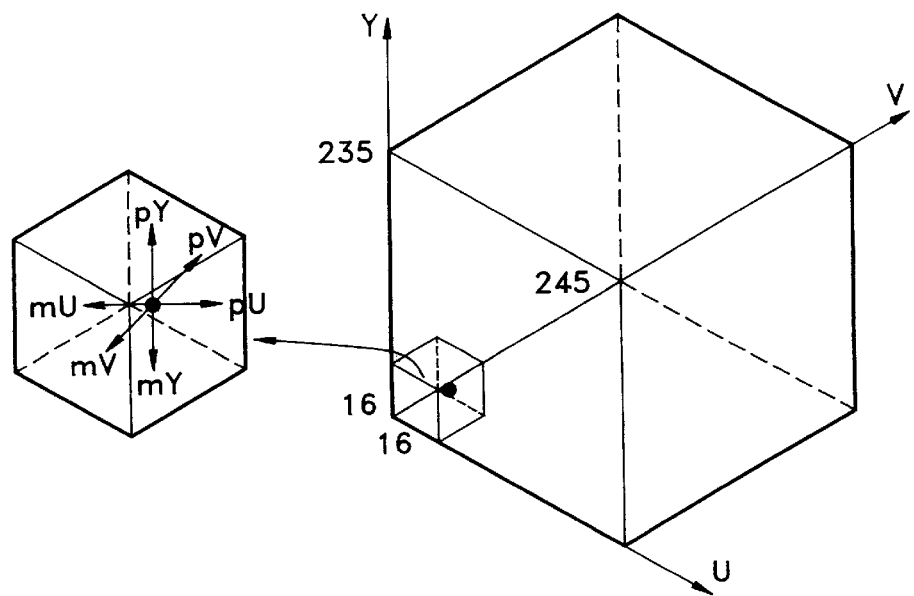
FIG. 7 is a drawing showing the structure of the perceptual color tolerance look-up-table shown in FIG. 6.

The perceptual chromatic difference LUT shown in FIG. 7 is composed and indexed by the following procedures. As the first step, each chromatic axis, Y, U and V of the YUV chromatic coordinate system, is divided into eight uniform spaces to have a total of 512 representative color divisions.

As the second step, perceptual color tolerances, pY, mY, pU, mU, pV, mV, of each chromatic component, Y, U, and V for the 512 representative colors, are defined. As the third step, perceptual color tolerances for Y, U and V chromatic components are decided by indexing YUV chromatic coordinates of a current original frame input from image input portion 11, using equation (2):

$$\text{index}=(Y/32)*64+(U/32)*8+(V/32) \tag{2}$$

Figure 5:
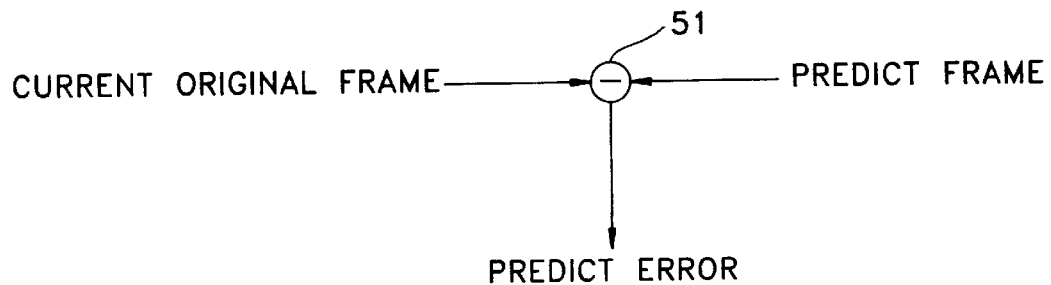
FIG. 5 is a detailed block diagram of the predict error generator shown in FIG. 1.

Predict error generator 13 generates a predict error from the difference between the current original frame and the predict frame output from image input portion 11, using subtractor 51 shown in FIG. 5. At this stage, the larger the average dispersion and the movement of a macroblock, the larger a predict error will be. Also, the smaller a real perceptual color tolerance is, the larger the relative dimension of a predict error will be. Thus, the reason for using a predict error instead of a current original frame in a coding procedure is to reduce the bit generation amount by eliminating the redundancy of frame signals which have a characteristic that identical video signals are redundantly distributed.

Perceptual predict error comparator 14 is for recognizing predict errors which are not perceptual by using the method described in connection with FIG. 8 and by comparing the perceptual color tolerance output (for Y, U and V chromatic components of the current original frame output) from perceptual color tolerance decision portion 12, with the predict error output from predict error generator 13.

Figure 8:
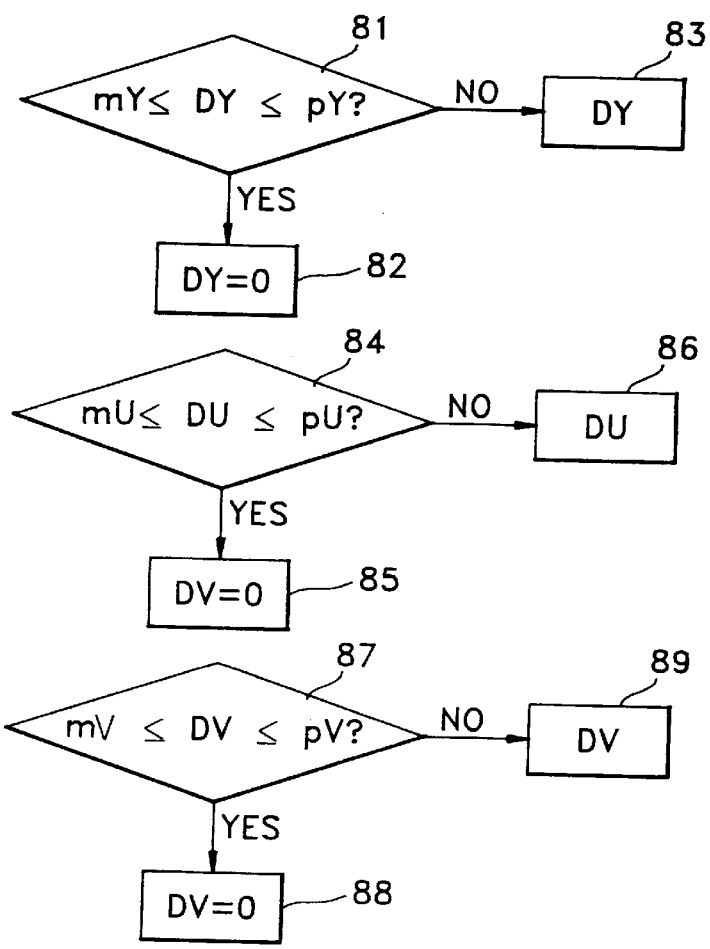
FIG. 8 is a drawing for describing the operation of the perceptual predict error comparator shown in FIG. 1.

As illustrated in FIG. 8, the procedure for recognizing predict errors comprises: in a first step, inputting perceptual color tolerances (mY,pY), (mU,pU) and (mV,pV) for a current original frame, defined by perceptual chromatic difference LUT defining; in the second step, defining; predict errors DY, DU and DV for each Y, U and V chromatic component comparing; and in the third step comparing; predict errors DY, DU and DV with perceptual color tolerances (mY,pY), (mU,pU) and (mV,pV) (by steps 81~83, 84~86 and 87~89, respectively, as illustrated in FIG. 8) and defining a predict error within the perceptual color tolerance as a non-perceptual predict error to be set to 0 as the predict error value.

In the perceptual predict error generator 15, a new perceptual predict error is generated by defining a predict error value recognized as a non-perceptual predict error as 0, as a result of a comparison of a perceptual color tolerance of the current original frame in perceptual predict error comparator 14.

Figure 9:
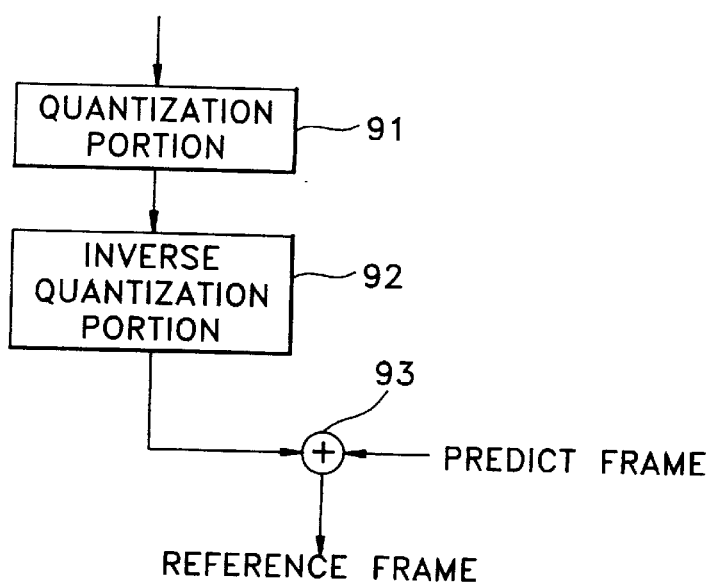
FIG. 9 is a detailed block diagram of the decoder shown in FIG. 1.

In decoder 16, as shown in FIG. 9, the quantization portion 91 quantizes perceptual predict error outputs from the perceptual predict error generator 15 to compress them. The inverse quantization portion 92 carries out inverse quantization of quantized perceptual predict errors, and the adder 93 combines restored perceptual predict errors and predict frames to compose a restored frame to be supplied to a user through video media.

As described above, the method and apparatus for coding an image, according to the present invention, for reducing the redundancy of digital video signals by the procedures of DPCM and DCT and for compressing a real frame in a quantization procedure, can reduce the deterioration of the picture quality of a restored frame (resulted from a quantization error) and the amount of bit generation due to the reduction of the amount of predict error generation. Also, a real time processing is possible by reducing the arithmetic operation time being used for defining perceptual color tolerance for each chromatic component by using a perceptual chromatic difference LUT.

Accordingly, the present invention is compatibly applicable to several digital video media coding techniques because it has the effect of reducing the amount of bit generation and of improving the picture quality of a restored frame.

What is claimed is:

1. An image coding apparatus, comprising:

a image input portion having a current original frame, a forward original frame, and a forward reference frame as inputs, said image input portion generating a predict frame from the current original frame and forward reference frame by a differential pulse coded modulation (DPCM);

a perceptual color tolerance decision portion for deciding a perceptual color tolerance of a chromatic component for each pixel of the current original frame input from said image input portion;

a predict error generator for generating a predict error between the predict frame input from said image input portion and the current original frame;

a perceptual predict error comparator for comparing the predict error output from said predict error generator and the perceptual color tolerance output from said perceptual color tolerance decision portion;

a perceptual predict error generator for generating a perceptual predict error recomposed by the predict error having a perceptual chromatic difference according to a result compared in said perceptual predict error comparator; and, a decoder for coding the current original frame by using the predict frame and the perceptual predict error output from said perceptual predict error generator and then composing a restored frame.

2. An image coding apparatus according to claim 1, wherein said image input portion comprises:

motion vector estimation portion for generating a motion vector by estimating the motion vector from said forward and current original frames; and motion vector compensation portion for generating the predict frame by applying differential pulse coded modulation (DPCM) using the motion vector for said current original and forward reference frames.

3. An image coding apparatus according to claim 1, wherein said perceptual predict error generator comprises means for recomposing said perceptual predict error by defining it to be 0, a predict error value residing within said perceptual color tolerance as a result of comparison of a perceptual color tolerance of the current original frame in said perceptual predict error comparator.

4. An image coding apparatus according to claim 1, wherein said decoder comprises:

a quantization portion for quantizing perceptual predict error outputs from said perceptual predict error generator;

an inverse quantization portion for generating restored perceptual predict errors by carrying out inverse quantization of quantized perceptual predict errors; and an adder for combining said restored perceptual predict errors and predict frame to generate a restored frame.

5. An image coding apparatus according to claim 1, wherein said perceptual color tolerance decision portion comprises: means for transforming a YUV non-uniform chromatic space for defining chromatic information of a color video into a CIE L*a*b* uniform chromatic space; means for deciding a perceptual color tolerance for L, a and b chromatic components in the transformed CIE L*a*b* chromatic coordinate system; and means for transforming the CIE L*a*b* perceptual color tolerance into a perceptual color tolerance for Y, U and V chromatic components, and for deciding YUV perceptual color tolerance for a pixel.

6. An image coding apparatus according to claim 5, wherein said perceptual color tolerance decision portion further comprises a perceptual chromatic difference look-up table for defining a perceptual color tolerance for Y, U and V chromatic componets.

7. An image coding apparatus according to claim 6, wherein said perceptual chromatic difference look-up table comprises perceptual color tolerance values for each Y, U and V chromatic components defined for each of 512 representative color divisions in nonuniform YUV perceptual chromatic space.

8. An image coding apparatus according to claim 7, wherein said perceptual predict error comparator comprises means for comparing DY, DU and DV predict errors for each Y, U and V chromatic components with perceptual color tolerances of a current original frame, (mY,pY), (mU,pU) and (mV,pV) defined by said perceptual chromatic difference look-up table.

9. An image coding apparatus according to claim 8, wherein said perceptual predict error comparator defines a predict error.

10. An image coding method comprising of the steps:
   (a) generating a predict frame from current original and forward reference frames by a differential pulse coded modulation (DPCM);
   (b) deciding a perceptual color tolerance of a chromatic component for each pixel of the current original frame;
   (c) generating a predict error between the predict frame and the current original frame;
   (d) comparing the predict error output from said step (c) and the perceptual color tolerance output from said step (b);
   (e) generating a perceptual predict error recomposed by the predict error having a perceptual chromatic difference according to a result compared in said step (d); and,
   (f) coding the current original frame by using the predict frame and the perceptual predict error output from said step (e) and then composing a restored frame.

* * * * *

UNITED STATES PATENT AND TRADEMARK OFFICE
CERTIFICATE OF CORRECTION

PATENT NO. : 5,838,375
DATED : November 17, 1998
INVENTOR(S) : Seong-jin Kim, et. al.

It is certified that error appears in the above-identified patent and that said Letters Patent is hereby corrected as shown below:

Col. 1, line 31, delete comma after "picture"; Col. 4, line 43, change -- ;-- to a -- ,--. Col. 5, line 33, delete "defining" (first occurrence) and delete semicolon (second occurence); Col. 5, line 35, delete "comparing" (first occurrence) and insert a comma after "step".

Signed and Sealed this

Twenty-fourth Day of October, 2000

Attest:

Q. TODD DICKINSON

*Attesting Officer*          *Director of Patents and Trademarks*